United States Patent
Huraux et al.

(10) Patent No.: US 9,550,914 B2
(45) Date of Patent: Jan. 24, 2017

(54) POLYAMIDE POWDER AND METHOD FOR COATING AN OBJECT BY MELTING SAID POWDER

(75) Inventors: Karine Huraux, Bourgtheroulde-Infreville (FR); Jean-Charles Durand, Evreux (FR)

(73) Assignee: Arkema France, Colombes (FR)

( * ) Notice: Subject to any disclaimer, the term of this patent is extended or adjusted under 35 U.S.C. 154(b) by 1114 days.

(21) Appl. No.: 13/576,211

(22) PCT Filed: Feb. 1, 2011

(86) PCT No.: PCT/FR2011/050194
§ 371 (c)(1),
(2), (4) Date: Jul. 31, 2012

(87) PCT Pub. No.: WO2011/092444
PCT Pub. Date: Aug. 4, 2011

(65) Prior Publication Data
US 2012/0301736 A1    Nov. 29, 2012

(30) Foreign Application Priority Data
Feb. 1, 2010   (FR) ..................................... 10 50660

(51) Int. Cl.
| | | |
|---|---|---|
| *C08L 77/00* | (2006.01) | |
| *C09D 177/00* | (2006.01) | |
| *C09D 5/03* | (2006.01) | |
| *C08K 3/00* | (2006.01) | |
| *C08K 5/00* | (2006.01) | |
| *C08L 71/02* | (2006.01) | |

(52) U.S. Cl.
CPC ............. *C09D 177/00* (2013.01); *C09D 5/037* (2013.01); *C08K 3/0033* (2013.01); *C08K 5/0041* (2013.01); *C08L 71/02* (2013.01); *Y10T 16/52* (2015.01); *Y10T 428/31725* (2015.04)

(58) Field of Classification Search
None
See application file for complete search history.

(56) References Cited

U.S. PATENT DOCUMENTS

| | | |
|---|---|---|
| 5,409,999 A | 4/1995 | Merval et al. |
| 5,830,983 A | 11/1998 | Alex et al. |
| 6,018,015 A | 1/2000 | Alex et al. |
| 2005/0171256 A1 | 8/2005 | Belder et al. |
| 2010/0015342 A1 | 1/2010 | Belder et al. |
| 2011/0172330 A1* | 7/2011 | Gobelt .................... C08L 71/02 523/400 |
| 2011/0236698 A1 | 9/2011 | Filou et al. |

FOREIGN PATENT DOCUMENTS

| | | |
|---|---|---|
| DE | 102007043048 A1 * | 3/2009 |
| EP | 0 412 888 A1 | 2/1991 |
| GB | 2 301 105 A | 11/1996 |
| WO | 03/082996 A2 | 10/2003 |
| WO | 2010/004227 A2 | 1/2010 |

OTHER PUBLICATIONS

International Search Report, dated Jun. 7, 2011, issued in corresponding PCT/FR2011/050194.

* cited by examiner

*Primary Examiner* — Ana Woodward
(74) *Attorney, Agent, or Firm* — Millen, White, Zelano and Branigan, P.C.

(57) ABSTRACT

The present invention relates to a coating composition in the form of a loose powder including the following by weight: 50% to 99.99% of polyamide powder, and 0.01% to 0.5% of polypropylene glycol, out of the total weight of the composition. The present invention relates in particular to a coating composition in the form of a powder including the following by weight: 50% to 99.9% of polyamide powder, 0.01% to 10% of at least one pigment and 0.01% to 0.5% of polypropylene glycol, out of the total weight of the composition. The present invention relates in particular to the use of said composition in methods for coating objects, in particular metal, by means of stuccoing.

9 Claims, No Drawings

POLYAMIDE POWDER AND METHOD FOR COATING AN OBJECT BY MELTING SAID POWDER

The present invention relates to the field of polyamide-based powder compositions used in processes for coating objects, especially metal objects. In these processes, the film or coating originates from the melting of a layer of powder deposited beforehand onto the object. These processes are referred to hereinbelow as "powder coating processes".

Several powder coating processes exist at the industrial scale. A first type of process is electrostatic powdering, which consists in charging the powder with static electricity and placing it in contact with the object to be covered, which is connected to a zero potential. For example, the powder is injected into an electrostatic gun which charges said powder via the corona effect, via triboelectrification or via a combination of the two. The powder thus charged is sprayed onto the object to be covered, which is connected to a zero potential. According to another form of electrostatic powdering, the object connected to a zero potential is dipped into a fluidized bed of charged powder. Inside the fluidized bed is powder with which it is desired to cover the object. This powder is in the form of small solid particles, i.e. particles between 0.01 and 1 mm in size, of any shape, which are in a state of fluidization inside the bed in the presence of air or any other gas. Electrodes are present in the fluidized bed, or a device is present to charge it via the triboelectric effect. The object covered with powder is then placed at a sufficient temperature, for example in an oven, to produce a coating by melting the powder leading to the film formation. For example, for a polyamide 11 powder, it suffices to heat to 220° C.

A second type of process consists in preheating the object to be covered to a temperature above the melting point of the powder. Once hot, the object is immediately immersed in a fluidized bed of powder; the powder melts in contact with the hot object and forms a film. A solid covering is thus produced.

Among the defects encountered in the polymer coatings obtained by powdering, pitting and fisheyes are most often noted. Pitting corresponds to the formation of holes or craters of the surface of a coating, caused by a defect of spreading of the polymer film when it forms the film and hardens. Fisheyes are generally formed when the coating cannot sufficiently wet the surface or when the polymer particles coalesce badly between each other or alternatively in the case of poor compatibility of the polyamide matrix with the pigments. The molten coating forms a pattern resembling fisheyes. In addition to being unattractive, these defects may lead to corrosion problems. It also arises that certain object surfaces and coatings undergo a loss of hue or yellowing.

Polyamide coatings have good abrasion resistance, good corrosion resistance and are very easy to use. Patents EP 0 367 653, EP 0 706 544, EP 0 821 039, EP 1 453 906, EP 1 541 650 and patent application WO 2008/029 070 filed by the Applicant describe these advantageous properties obtained with polyamide coatings.

The present invention more particularly concerns high-performance coatings, which combine numerous properties, namely:
 functional properties: resistance to corrosion, to abrasion, chemical resistance, resistance to hydrolysis, thermal resistance, UV resistance, resistance to dry heat, flexibility of the coating film; or esthetic properties: especially of metallic appearance, for example silvery, golden or iridescent.

Coating compositions prepared by dry mixing and containing metallic pigments (aluminum) or nacreous pigments (for example mica/titanium oxide) are particularly sensitive to the formation of fisheyes and also to the flyaway of pigments during fluidization. The aim of the present invention is thus to provide a polyamide powder composition and a coating process that do not have these drawbacks. In particular, the aim of the present invention is to provide an improved coating powder composition:
 which avoids the formation of fisheyes, craters and other coating defects at the surface of the film, and
 which is easy to use in the existing powder coating processes.

The Applicant has shown that a particular use of polypropylene glycol in such a polyamide coating powder composition makes it possible to limit pigment flyaway during the powdering process and above all makes it possible to remedy the surface defects (fisheyes) on the coatings obtained.

One subject of the present invention is thus a coating composition in loose powder form comprising, by weight:
 from 50% to 99.99%, preferably from 80% to 99.99%, preferably from 90% to 99.99%, or better still from 99.5% to 99.99%, of polyamide powder,
 from 0.01% to 0.5% of polypropylene glycol, preferably from 0.05% to 0.2% and preferably from 0.05% to 0.1% of polypropylene glycol,
relative to the total weight of the composition.

A subject of the present invention is especially a coating composition in powder form comprising, by weight:
 from 50% to 99.9% and preferably from 89.5% to 99.9% of polyamide powder,
 from 0.1% to 10% of at least one pigment,
 from 0.01% to 0.5% of polypropylene glycol,
relative to the total weight of the composition.

A subject of the present invention is also a coating composition in powder form comprising, by weight:
 from 50% to 99.9% and preferably from 94.5% to 99.9% of polyamide powder,
 from 0.1% to 5% of at least one optical-effect pigment,
 from 0.01% to 0.5% of polypropylene glycol,
relative to the total weight of the composition.

The composition according to the invention serves especially for covering and/or protecting all kinds of objects, especially metal objects, such as those made of aluminum, aluminum alloys, steel and steel alloys, etc. The invention is particularly useful for articles made of metal wire, for example the metal baskets of dishwashers. The composition of the invention, in the form of a coating, can also cover non-metallic objects, such as wood, plastic, ceramic or textiles.

Polyamide Powder:

Advantageously, the polyamide (abbreviated as PA) is chosen from PA 11, PA 12, PA 6.10, PA 6.12, PA 6.14, PA 6.18, PA 10.10 and PA 10.12, and copolyamides, and mixtures thereof. These polyamides are especially described in patent application FR 2 933 706 on page 11, line 9 to page 14, line 23. Polyamides with an inherent viscosity in the range from 0.7 to 2 and preferably in the range from 0.86 to 1.15 are preferred (inherent viscosity measured at a polyamide concentration of 0.5% by weight as a solution in meta-cresol relative to the total weight of the solution, at 20° C., using an Ubbelohde viscometer). In particular, the Rilsan® polyamide 11 powders form coatings that impart surface protection offering a unique combination of properties: chemical resistance, corrosion resistance, abrasion resistance, impact strength, cavitation-erosion resistance, low coefficient of friction, esthetic surface finish, pleasant feel, compatibility with food products, and hygiene and antibacterial properties. Although, in accordance with one preferred embodiment of the invention, the present invention is generally described in the rest of the text with reference to a PA 11 powder (which has the additional advantage of being of renewable origin), the present invention is obviously not limited to PA 11 powders. The present invention includes any PA powder (homopolyamide or copolyamide) in which the particles have a granulometry of between 5 and 1000 μm and preferably from about 40 to 200 μm. As examples of polyamide grades that are commercially available and particularly suitable for the present invention, mention may be made especially of the Rilsan® brand products based on PA 11 from the company Arkema.

Pigment(s)

Advantageously, the composition of the invention comprises from 0.1% to 10% of at least one pigment. A pigment is a dyestuff and/or affords a "metallic" or "iridescent" appearance, in the form of a powder (colored, white or black), and is insoluble, in contrast with "dyes" per se, in solvents and substrates.

According to one embodiment of the invention, the coating compositions comprise conventional monochromatic pigments, such as those commonly used in the paints and paintings of the prior art. These pigments are responsible for the color and opacity of the coating. They are pulverulent solids, of very fine granulometry (generally less than 1 μm), mineral or organic, which are well known to those skilled in the art. Examples that may be mentioned include titanium dioxide, zinc oxide, carbon black, iron oxides, potassium or sodium ferric ferrocyanides, chromium oxide green, chromophores, auxochromes, azo dyes, phthalocyanins, etc. These very common pigments are therefore not described further.

According to one preferred embodiment of the invention, the composition comprises at least one effect pigment chosen from diffractive pigments, interference pigments, such as nacres, and reflective pigments, and mixtures thereof. These pigments are defined in patent application FR 2 933 706. The term "effect pigment" means any material with a specific optical effect. This effect is different than a simple conventional hue effect, i.e. a unified and stabilized effect as produced by standard dyestuffs, for instance monochromatic pigments. For the purposes of the invention, the term "stabilized" means devoid of any effect of color variability according to the angle of observation or in response to a change in temperature. For example, the optical-effect material may be chosen from particles with a metallic tint, goniochromatic coloring agents, diffractive pigments, thermochromic agents, optical brighteners, and also fibers, especially interference fibers. Needless to say, these various materials may be combined so as to produce the simultaneous manifestation of two effects, or even of a novel effect in accordance with the invention.

The effect pigments that may be included in the composition of the invention are preferably chosen from diffractive pigments, interference pigments and reflective pigments, and mixtures thereof. They may be present in the composition of the invention in a content ranging from 0.1% to 10% by weight, preferably from 0.1% to 5% by weight, preferably from 0.1% to 3% by weight and better still from 0.1% to 1% by weight relative to the total weight of the composition.

The term "interference pigment" denotes a pigment capable of producing a color via an interference phenomenon, for example between the light reflected by a plurality of superposed layers with different refractive indices, especially a succession of layers with high and low refractive indices. An interference pigment may, for example, comprise more than four layers with different refractive indices. The layers of the interference pigment may or may not surround a core, which may or may not have a flattened shape. Nacres are examples of interference pigments. The term "nacre" should be understood as meaning colored particles of any form, which may or may not be iridescent, especially produced by certain mollusks in their shell, or alternatively synthesized, and which have a color effect via optical interference. Examples of nacres that may be mentioned include nacreous pigments such as titanium mica coated with an iron oxide, mica coated with bismuth oxychloride, titanium mica coated with chromium oxide, titanium mica coated with an organic dye especially of the abovementioned type, and also nacreous pigments based on bismuth oxychloride. They may also be mica particles at the surface of which are superposed at least two successive layers of metal oxides and/or of organic dyestuffs. Among the nacres that are commercially available, mention may be made of the nacres sold by the company BASF, by the company Merck, by the company Eckart and by the company Engelhard. The nacres may more particularly have a yellow, pink, red, bronze, orange, brown, grey, silver, coppery, metallic and/or moiré color or tint. As illustrations of nacres that may be introduced as interference pigments into the composition of the invention, mention may be made of the gold-colored nacres sold especially by the company Engelhard under the name Brilliant gold 212G (Timica), Gold 222C (Cloisonne), Sparkle gold (Timica), Gold 4504 (Chromalite) and Monarch gold 233X (Cloisonne); the bronze nacres sold especially by the company Merck under the name Bronze fine (17384) (Colorona) and Bronze (17353) (Colorona) and by the company Engelhard under the name Super bronze (Cloisonne); the orange nacres sold especially by the company Engelhard under the name Orange 363C (Cloisonne) and Orange MCR 101 (Cosmica) and by the company Merck under the name Passion orange (Colorona) and Matte orange (17449) (Microna); the brown nacres sold especially by the company Engelhard under the name Nu-antique copper 340XB (Cloisonne) and Brown CL4509 (Chromalite); the nacres with a copper tint sold especially by the company Engelhard under the name Copper 340A (Timica); the nacres with a red tint sold especially by the company Merck under the name Sienna fine (17386) (Colorona); the nacres with a yellow tint sold especially by the company Engelhard under the name Yellow (4502) (Chromalite); the red nacres with a gold tint sold especially by the company Engelhard under the name Sunstone G012 (Gemtone); the pink nacres sold especially by the company Engelhard under the name Tan opal G005 (Gemtone); the black nacres with a gold tint sold especially by the company Engelhard under the name Nu antique bronze 240 AB (Timica), the blue nacres sold especially by the company Merck under the name Matte blue (17433) (Microna), the white nacres with a silvery tint sold especially by the company Merck under the name Xirona Silver, and the golden-green pink-orange nacres sold especially by the company Merck under the name Indian summer (Xirona), and mixtures thereof. A dyestuff chosen from nacres, in particular micas covered with at least one layer of metal oxide, is preferably used.

Needless to say, the use of other effect pigments, such as interference reflective particles, goniochromatic pigments, dispersed goniochromatic fibers with a length of less than 80 μm, for example, diffractive pigments and/or reflective particles, as described in patent application FR 2 933 706 (page 15, line 24 to page 27, line 11), may also be envisioned.

Advantageously, the composition of the invention also comprises from 0.1% to 0.3% by weight of at least one metallic pigment. The term "metallic pigment" covers powders based on aluminum, magnesium, copper, iron (steel), bronze, titanium or mica-treated derivatives, generally used as additives, in particular for paints and inks. The physical parameters influencing the "metallic" appearance imparted by said pigments are the mean sizes of the particles constituting the powder, their shape, their distribution and their orientation in the final formulation. They generally have a particle size of between 5 and 25 μm and a flat scale or flake form or alternatively a microlamellar form and are subdivided into two types, depending on their behavior on wetting in solvents:

Film-forming (or leafing) pigments which remain at the surface of the formulation and become oriented parallel to the interfaces, forming a dense metallic layer, which gives the medium a very high reflective power and excellent protection.

Non-film-forming (non-leafing) pigments which become oriented more or less parallel to the substrate, randomly and at the bottom of the layer of the preparation.

The composition according to the invention may comprise metallic pigments, preferably non-film-forming pigments, preferentially of aluminum type, and on condition that their content in the composition does not exceed 0.3% by weight relative to the total weight of the composition.

As examples of metallic pigments that may be used in the composition of the present invention, mention may be made of those of the company Eckart-Werke: Chromal® X (film-forming aluminum powders, surface-treated with stearic acid, with a mean diameter of 9 μm) or Chromal® XV (film-forming aluminum powders).

Polypropylene Glycol (Abbreviated as PPG):

The content of polypropylene glycol used in the composition of the invention is within the range from 0.01% to 0.5% by weight, preferably from 0.05% to 0.2% and preferably from 0.05% to 0.1% relative to the total weight of the coating powder composition. A content of greater than 0.5% is not suitable since it can reduce the flow or fluidization of the powder during the coating process.

Preferably, the molar mass of the polypropylene glycol is within the range from 1000 to 3000 g/mol. Molar masses of less than 1000 g/mol require the polypropylene glycol content to be increased in order to avoid the formation of fisheyes at the surface of the coating, which may make the powder composition more difficult to use in powder coating processes. Since, instead of forming a powder of perfectly loose particles, the composition may comprise aggregates or muds that are impossible to fluidize and/or the coating obtained is not smooth. Conversely, if the molar mass of the polypropylene glycol is greater than 3000 g/mol, it mixes with difficulty with the polyamide powder, the composition obtained is too viscous to obtain a loose powder, the mixture is not sufficiently homogeneous and the coating film may produce a phase separation between the PA and the PPG in certain places.

Additives:

A composition according to the invention may also comprise all kinds of additives and adjuvants usually used in the field of coatings. These may be additives that impart certain specific properties to the coating powder and/or film, such as the fluidity capacity, the flowability, etc. By way of example, the additives may be chosen from film-forming agents and, where appropriate, film-forming auxiliaries, gums, semicrystalline polymers, antioxidants, anticorrosion agents, preserving agents, UV stabilizers, and mixtures thereof. Mention may also be made of pigments for absorbing infrared, carbon black, mineral fillers for reducing the internal constraints and flame-retardant additives. These fillers are, for example, glass fibers, carbon fibers, nanofillers, nanoclays and carbon nanotubes.

A person skilled in the art can via routine operations adjust the nature and amount of the additives and/or fillers present in the compositions in accordance with the invention, such that the esthetic properties and viscosity properties desired for these compositions are not thereby affected.

Process for Manufacturing the Powder Composition:

A subject of the present invention is also a process for manufacturing a powder composition in accordance with the invention, comprising the dry blending of the polyamide in powder form, polypropylene glycol and optional pigment(s), preferably added in this order. The PPG is preferably added at the start of mixing, before the pigment(s). The reason for this is that, when it is added at the end of mixing, it may cause poor fluidization and give a non-uniform hue to the final coating. The mixing is advantageously performed at room temperature. In the examples described below, a Henschel mixer is used, the spin speed of which is adjusted by the operator. Needless to say, any other type of mixer may be used, for instance a Magimix or Lödige mixer.

The powders may optionally be screened after mixing. The mean diameter (D50 in the present description) of the powder particles of the composition according to the invention is advantageously between 5 μm and 1 mm and preferably in the range from 40 to 200 μm. The D50 is measured according to standard ISO 9276—parts 1 to 6: "Representation of data obtained by particle size analysis".

Powder Coating Process:

More generally, a subject of the present invention is the use of polypropylene glycol in a polyamide-based pulverulent composition for the powder coating of objects, especially metal objects. Powder coating especially comprises electrostatic powdering and/or dipping in a fluidized bed and/or "minicoat" and/or "maxicoat" coating, especially for the high-speed coating of components of all sizes. The use of a composition in accordance with the invention in a process for the powder coating of an object, especially a metal object, is particularly preferred. The process of the invention may also cover non-metallic objects, for instance wood, plastic or ceramic.

A subject of the present invention is also a process for coating an object by melting a layer of powder composition in accordance with the invention.

According to a first embodiment, the process of the invention comprises the following steps:
electrically charging the powder,
approaching the object to the powder or placing the object and the powder in contact, the object being connected to a zero potential or a potential sufficient to cover it with powder,
subjecting the powder-covered object to a sufficient temperature to obtain a coating by melting of the powder.

According to a second embodiment, the process of the invention comprises the following steps:
placing the powder in a fluidized bed,
heating the object to be covered to a sufficient temperature for the powder to melt on contact therewith, dipping the object in the fluidized bed for a sufficient time for it to become covered with powder, removing the object from the fluidized bed.

According to a third embodiment, the process comprises the following steps:

heating the object to be covered to a sufficient temperature for the powder to melt on contact therewith, spraying the powder onto the object in order for it to become covered with powder.

Irrespective of the powder coating mode, the object is covered with a thin layer of powder. The thickness of the thin layer of powder may be up to 2 mm, and is advantageously between 0.1 and 0.6 mm. After powdering, the object is optionally subjected to heating or baking (post-fusion) to complete the smoothing of the coating. The powder melts, forms a film and produces the coating.

The present invention also relates to any type of object comprising a coating obtained by powdering with a composition in accordance with the invention. This object is advantageously chosen from the following objects: a dishwasher basket, a printer roller, a clip or an adjuster in the textile industry, a clip, spring or hinge for the building industry, an exterior or interior furniture component, a case component, connector, tube, sheath or cable, a sports equipment, shoe, sports shoe, shoe sole, decorative, baggage or spectacle component, a component of audio-visual equipment, an information technology, electrical or electronic component, a component of motor vehicle or aeronautical equipment, or a component of medical and/or agrifood equipment.

The object according to the invention is advantageously in the building sector (nails, screws, fastenings, grapplers, gudgeons, hooks), the electrical and electronic industry (cable grips, fastenings, ferrites), in the textile sector (bras, buckles, buttons), in the motor vehicle sector (splined shafts, rails for sliding doors, seat rails, springs, fastenings, clasps, moving pieces, seatbelt buckles), and in the fluids industry (pipes, joints, pumps and valves).

EXAMPLES

The examples below illustrate the present invention without limiting its scope. In the examples, unless otherwise indicated, all the percentages and parts are expressed on a weight basis.

Although the tests refer to a composition based on polyamide 11, it is clearly understood that the compositions according to the present invention are not limited to this embodiment, but may comprise any type of polyamide, alone or as a mixture.

Manufacture of the Compositions of Tests 1 to 17.

A polyamide 11 powder Rilsan® (PA 11) with an inherent viscosity in the range from 1.05 to 1.15 (measured at 0.5% by weight in meta-cresol, at 20° C.) is used. The polyamide powder has a D50 substantially equal to 100 µm.

The following pigments are used:

Black, yellow and red pigments (iron oxide) of brand Bayferrox® and of respective particle size: 0.6 µm, 0.2-0.8 µm and 0.17 µm.

Interference pigments, of brand Iriodin® from Merck:
for tests 1 to 14: mica/$TiO_2$/$SnO_2$ pigment of particle size ranging from 1 to 15 µm,
for tests 15 and 16: mica/$TiO_2$/$SnO_2$ of particle size ranging from 20 to 100 µm.

Aluminum pigment: 15 µm of brand Standart® PCS 1500 from Eckart.

Various types and contents of polyether (PEG, PPG, PTMG or PEG-PPG copolymer) are tested in the reference composition (Table 1, "Ref" column):

in the comparative tests 1 to 6: polyethylene glycol (PEG) of respective molar masses (in g/mol) 600 (contents of 0.05% and 0.1%), 1500 (0.05% and 0.1%) and 8000 (0.05% and 0.1%);

in tests 7 to 12: polypropylene glycol (PPG) of respective molar masses (in g/mol): 450 and 2000 (0.05%; 0.1% and 0.2%);

in comparative test 13: polytetramethylene glycol (PTMG) of molar mass (in g/mol) 2000 (content of 0.2%);

in comparative test 14: PEG/PPG copolymer (80/20 ratio) of molar mass 8000 (content 0.1%).

The polyether is added to the polyamide powder by dry blending. The pigments are then added by dry blending to the mix thus obtained. A 10 L Henschel mixer is used. The PA powder is introduced into the mixer and stirring is started. The polyether is added and the mixture is blended (60 seconds at 900 rpm). All the pigments are then added and the mixture is again blended (100 seconds at 900 rpm).

Each composition is used in a coating process according to the invention, by dipping in a fluidized bed.

Needless to say, the device for dipping in a fluidized bed is given merely as an example, and any other device for coating an object with a film, such as spraying or electrostatic powdering, may also be employed in the process of the invention.

Each coating powder composition is applied by powdering onto 5 steel plates 100×50×3 mm in size. The application conditions comprise:

heating of the plates for 10 minutes at 330° C., followed by dipping them for 4 seconds in the fluidized bed, and then cooling them in air.

The compositions with a high content of pigments generally form a cloud of pigment(s) above the fluidized bed and leave a deposit on the edge of the tank after only a few seconds of fluidization, this deposit consisting essentially of pigments.

It is noted that the formula containing PPG does not form a cloud of pigments above the fluidized bed and gives only the deposit of polyamide powder usually found during the fluidization of a pigment-free polyamide powder.

Microscopy images did not demonstrate any bonding or impregnation of the pigments onto the grains of powder in the compositions of the invention.

Evaluation of the fisheyes on the coatings obtained: Table 1 notes the presence ("yes" or "no") of fisheyes on the coating obtained on each plate.

Among the products tested, only:

PPG 2000 when it is used at contents of 0.05%, 0.1% or 0.2% in the composition (Examples 10 to 12), and PPG 450 used at 0.2% (Example 9) make it possible to totally eliminate fisheyes.

No improvement of this defect that remains present on the coatings obtained by powdering with compositions comprising PEG, PTMG or PEG/PPG copolymer is observed (comparative tests 1 to 6 and 13 to 14). On the contrary, even additional defects (craters) are observed with polyethers of molar mass 8000 g/mol (PEG and PEG/PPG copolymer) and with PTMG. A phase separation between the polyamide and PEG is also noted on the films obtained in comparative tests 5 and 6.

TABLE 1

Tests 1 to 14

| | Test 1 | Test 2 | Test 3 | Test 4 | Test 5 | Test 6 | Test 7 | Test 8 | Test 9 | Test 10 | Test 11 | Test 12 | Test 13 | Test 14 | Test 15 |
|---|---|---|---|---|---|---|---|---|---|---|---|---|---|---|---|
| | Ref | Comp 1 | Comp 2 | Comp 3 | Comp 4 | Comp 5 | Comp 6 | Ex 7 | Ex 8 | Ex 9 | Ex 10 | Ex 11 | Ex 12 | Comp 13 | Comp 14 |
| Polyamide 11 Rilsan | 98.76 | 98.71 | 98.66 | 98.71 | 98.66 | 98.71 | 98.66 | 98.71 | 98.66 | 98.56 | 98.71 | 98.66 | 98.56 | 98.56 | 98.66 |
| Interference pigment | 1 | 1 | 1 | 1 | 1 | 1 | 1 | 1 | 1 | 1 | 1 | 1 | 1 | 1 | 1 |
| Yellow pigment | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Black pigment | 0.07 | 0.07 | 0.07 | 0.07 | 0.07 | 0.07 | 0.07 | 0.07 | 0.07 | 0.07 | 0.07 | 0.07 | 0.07 | 0.07 | 0.07 |
| Red pigment | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 |
| PEG 600 | | 0.05 | 0.1 | | | | | | | | | | | | |
| PEG 1500 | | | | 0.05 | 0.1 | | | | | | | | | | |
| PEG 8000 | | | | | | 0.05 | 0.1 | | | | | | | | |
| PPG 450 | | | | | | | | 0.05 | 0.1 | 0.2 | | | | | |
| PPG 2000 | | | | | | | | | | | 0.05 | 0.1 | 0.2 | | |
| PTMG 2000 | | | | | | | | | | | | | | 0.2 | |
| PEG/PPG copolymer (80/20) 8000 | | | | | | | | | | | | | | | 0.1 |
| Presence of fisheyes | yes | yes | yes | yes | yes | yes + PA/PEG phase separation | yes + PA/PEG phase separation | rare | rare | no | no | no | no | yes + other coating defects | yes + other coating defects |

Tests on other formulations detailed in Table 2 below show that PPG contents of 0.05% or 0.075% may suffice to eliminate fisheyes.

TABLE 2

Examples 15 to 17

| | Ex 15 | Ex 16 | Ex 17 |
|---|---|---|---|
| PA 11 powder | 98.85 | 98.025 | |
| Blue colored PA 11 powder | | | 99.4 |
| PPG 2000 | 0.05 | 0.075 | 0.1 |
| Interference pigments | 1 | 1.6 | |
| Iron oxide black pigment | 0.1 | 0.2 | |
| Iron oxide red pigment | | | 0.5 |
| Aluminum pigment | | 0.1 | |
| Flyaway/depositions of pigments | no | no | no |
| Presence of fisheyes | no | no | no |

The presence of PPG in the polyamide powder composition according to the invention does not alter the other performance qualities of the polyamide coatings (abrasion resistance, corrosion resistance, etc.). In addition, crossed contamination tests showed that traces of grades of PPG-supplemented PA powder (compositions according to the invention) did not contaminate the grades of PA powders that do not comprise any anti-crater agent.

The use of a powder composition according to the invention (Examples 9 to 12 and 15 to 17) in a powder coating process makes it possible to obtain components coated with a homogeneous film free of defects and of fisheyes.

The invention claimed is:

1. A coating composition in free powder form comprising, by weight:
   from 50% to 99.99% of polyamide powder,
   from 0.01% to 0.5% of polypropylene glycol,
   relative to the total weight of the composition, wherein the composition is obtained by dry mixing of the polyamide powder and the polypropylene glycol.

2. The coating composition according to claim 1, in powder form comprising, by weight:
   from 50% to 99.9% of polyamide powder,
   from 0.1% to 10% of at least one pigment,
   from 0.01% to 0.5% of polypropylene glycol,
   relative to the total weight of the composition.

3. The coating composition according to claim 1, in powder form comprising, by weight:
   from 50% to 99.9% of polyamide powder,
   from 0.1% to 5% of at least one optical-effect pigment,
   from 0.01% to 0.5% of polypropylene glycol,
   relative to the total weight of the composition.

4. The composition as claimed in claim 3, in which said at least one optical-effect pigment is a diffractive pigment, an interference pigment, a reflective pigment, or a mixture thereof.

5. The composition as claimed in claim 1, in which the polyamide is PA 11, PA 12, PA 6.10, PA 6.12, PA 6.14, PA 6.18, PA 10.10, PA 10.12, a copolyamide thereof, or mixtures thereof.

6. The composition as claimed in claim 1, in which the molar mass of the polypropylene glycol is within the range of from 1000 to 3000 g/mol.

7. The composition as claimed in claim 1, also comprising from 0.1% to 0.3% by weight of at least one metallic pigment.

8. A process for manufacturing a powder composition in accordance with claim 1, comprising the dry blending of polyamide, polypropylene glycol and an optional pigment.

9. The process as claimed in claim 8, in which the polyamide, the polypropylene glycol and the optional pigment are added in this order during the dry blending.

* * * * *